United States Patent [19]

Hoehn et al.

[11] Patent Number: 4,809,786
[45] Date of Patent: Mar. 7, 1989

[54] REMOTELY ADJUSTABLE DISK LEVELING SYSTEM

[75] Inventors: Kevin W. Hoehn, Johnston; Warren L. Tompson, Ankeny, both of Iowa

[73] Assignee: Deere & Company, Moline, Ill.

[21] Appl. No.: 126,316

[22] Filed: Nov. 30, 1987

[51] Int. Cl.⁴ .............................................. A01B 63/00
[52] U.S. Cl. .................................... 172/316; 172/328; 74/424.8 R
[58] Field of Search ............... 172/327, 326, 328, 316, 172/324, 504, 413; 91/36, 498, 492, 35, 499, 39; 74/424, 424.8 R, 424.5; 56/11, 9

[56] References Cited

U.S. PATENT DOCUMENTS

| | | | |
|---|---|---|---|
| 3,809,165 | 5/1974 | Miller | 172/328 |
| 3,912,017 | 10/1975 | Rehn | 172/328 |
| 4,325,274 | 4/1982 | Martelee | 81/58.1 |
| 4,379,491 | 4/1983 | Riewerts | 172/328 |
| 4,506,590 | 3/1985 | Miko | 91/35 |

*Primary Examiner*—Richard J. Johnson

[57] ABSTRACT

Adjustable link structure for providing on-to-go disk harrow adjustment from the cab of the towing vehicle. The mechanism for automatically maintaining the frame of a disk harrow at a level condition as the frame is raised and lowered relative to the ground includes an adjustable link member with a rotary hydraulic motor utilized to adjust a mechanical screw type mechanism to maintain a set adjustment position independently of continued fluid pressure to the motor.

8 Claims, 2 Drawing Sheets

REMOTELY ADJUSTABLE DISK LEVELING SYSTEM

BACKGROUND OF THE INVENTION

The present invention relates generally to agricultural tillage equipment, and more specifically, to a system for adjusting the relative cutting depth of front and rear gangs of tillage tools on a framed tillage implement.

Towed disk harrows conventionally utilize a spring-loaded mechanism for adjusting the relative cutting depth of front and rear gangs of disks to level the implement to prevent uneven tillage and to adjust for different soil and trash conditions. Such a structure is shown, for example, in Rehn U.S. Pat. No. 3,912,017 and is utilized in commercially available disk harrows such as the John Deere Model 235 Disks. Conventional systems require the operator to stop and dismount the tractor to manually adjust the system when leveling is required, and because the adjustment is iterative, several trips off the tractor may be necessary. Some other types of systems utilize a hydraulic cylinder to control the mechanism, but due to cylinder leakage, a set position cannot be maintained over an extended operating period.

BRIEF SUMMARY OF THE INVENTION

It is therefore an object of the present invention to provide an improved leveling system for an agricultural implement such as a disk harrow. It is a further object to provide such a system which can be adjusted quickly and easily. It is a further object to provide such a system which is remotely adjustable from the tractor seat and yet which maintains the set position over extended operating periods.

It is yet another object of the present invention to provide an improved leveling system for an agricultural tillage implement such as a disk harrow which facilitates adjustment on the go and eliminates the need for the operator to leave the seat of the towing vehicle. It is a further object to provide such a system which is relatively compact and may be retrofitted onto existing leveling systems. It is still another object to provide such a system which reliably maintains a selected position even over extended operating periods.

In accordance with the above objects, a disk harrow having fore-and-aft spaced gangs of disks includes a frame vertically adjustable by ground wheel structure. A pivoting hitch structure is operably connected to the ground wheel structure through link structure connected between the hitch and the rockshaft of the wheel structure so that as the frame is raised and lowered, the frame will be maintained in a preselected level condition. The link structure includes an arm pivotally connected to the frame adjacent the hitch having one end connected to the hitch and the other end connected to rotatable screw structure. The rotatable screw structure is connected to the rockshaft and has an effective length which varies with rotation of the screw structure. As the effective length is decreased the spring force of a coil spring is increased, transferring vertical force from the front to rear gangs. A hydraulic motor is pivotally mounted to the upper end of the arm by a special bracket and is connected to the screw so that the effective length adjustment may be made remotely from the tractor seat. As the effective length is adjusted, the relative height and vertical force of the front and rear gangs of disks are changed to provide the desired disk leveling for given operating and field conditions. The operator does not have to leave his seat to make the changes, and the rotary hydraulic motor in combination with a screw-type mechanism maintains a preselected adjusted position over a long period of time since once the length is set, the structure does not rely on the hydraulic motor to maintain the adjustment.

These and other objects, features and advantages of the present invention will become apparent to those skilled in the art from the description which follows and from the drawings.

DESCRIPTION OF THE PREFERRED EMBODIMENT

Figure 1:
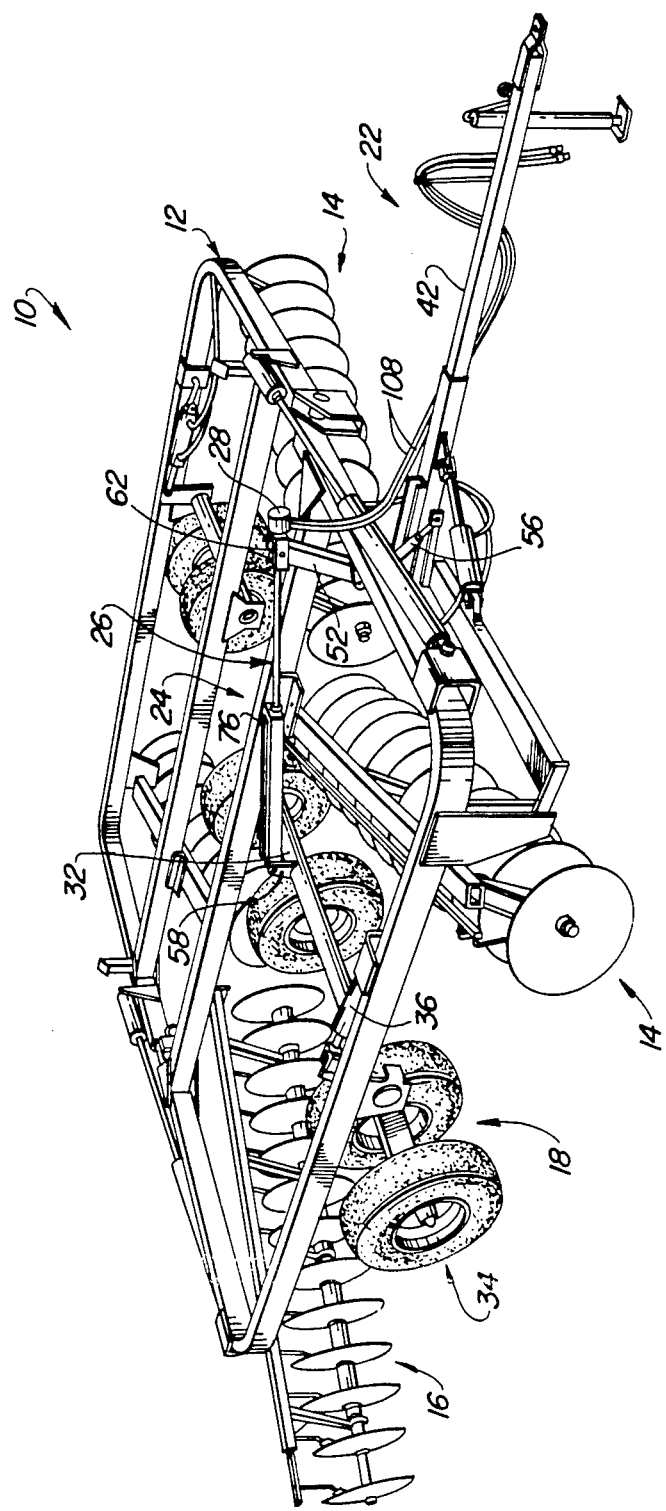
FIG. 1 is a front perspective view of a disk harrow with the on the go leveling structure of the present invention attached thereto.

Referring to FIG. 1, there is shown a disk harrow 10 having a main frame 12 supporting front and rear angled disk gangs 14 and 16, respectively. Vertically adjustable ground wheel structure 18 is connected to the frame 12 for moving the frame between a lowered field-working position and a raised transport position. Hitch structure 22 is pivotally connected to the forward portion of the frame 12 for rocking about a generally horizontal transverse axis. Adjustable link structure indicated generally at 24 is connected between the pivoting hitch structure 22 and the ground wheel structure 18 to automatically maintain the frame 12 in a preselected level condition as the ground wheel structure 18 is adjusted vertically. The link structure 24 includes an adjustable link member 26 having an effective length which is variable to determine spring compression and the relative force and height of the front and rear disk gangs 14 and 16. As will be described in detail below, the adjustable link member 26 includes rotatable screw structure which is connected to a rotating hydraulic motor 28 so that leveling adjustments can be made as necessary from the operator station on the towing vehicle connected to the hitch structure 22.

With the exception of the adjustable link structure 24 with the associated hydraulic motor and motor mounting structure, the disk harrow 10 as shown is generally of conventional construction of the type exemplified by the commercially available John Deere Model 235 Disk. The ground wheel structure 18 includes a transversely extending rockshaft 32 pivotally connected to the frame 12 and supporting a pair of transversely spaced ground wheel assemblies 34. A hydraulic cylinder 36 is operably connected between the frame 12 and the rockshaft 32 to raise and lower the wheel assemblies 34 to thereby move the frame between field-working and transport positions and to adjust working depth when the frame is in the field-working position. The forward hitch structure 22 includes a main fore-and-aft extending hitch beam 42 having diverging rearward ends 44 pivotally connected for rocking about an axis 45 to pivot brackets 46 extending downwardly from the forward end of the frame 12. The adjustable link structure 24 operably connects the forward hitch structure 22 with the rockshaft 32 to pivot the main hitch beam 42 in response to vertical movement of the frame 12 relative to the ground.

The link structure 24 includes an upright arm 52 pivotally connected by a bracket 54 (FIG. 2) to the forward portion of the frame 12 for rocking about a horizontal, transverse axis. A link 56 is pivotally connected between the lower end of the upright arm 52 and the hitch beam 42 at a location forwardly of the pivotal axis 45 of the hitch beam 42. The adjustable link member 26 is connected at its forward end to the upper end of the upright arm 52. The aft end of the link member 26 is connected to an upwardly projecting rockshaft bracket 58. Therefore, as the rockshaft 32 is pivoted to raise the frame 12, the member 26 will move the upper end of the upright arm 52 rearwardly about the pivotal connection of the arm to the frame to thereby move the link 56 forwardly and pivot the hitch beam 42 downwardly about the pivotal axis of the beam with the frame 12. Upon lowering of the frame 12, the opposite action takes place causing the main hitch beam 42 to pivot upwardly about its pivotal connection with the frame 12. This action maintains a relatively constant preselected level condition of the frame 12 during vertical adjustment and movement between the transport and field-working positions of the implement. By adjusting the link member 26, the preselected level condition may be changed depending on field and operating conditions to assure good disking action which does not leave center ridges or valleys in the disked field. Preferably, the link 56 is a turnbuckle which can be adjusted to provide proper leveling when the upright arm 52 is stopped against the frame 12 in its transport position. Further explanation of the force transferring and leveling action may be had by referring to the afore-mentioned Rehn U.S. Pat. No. 3,912,017.

Figure 2:
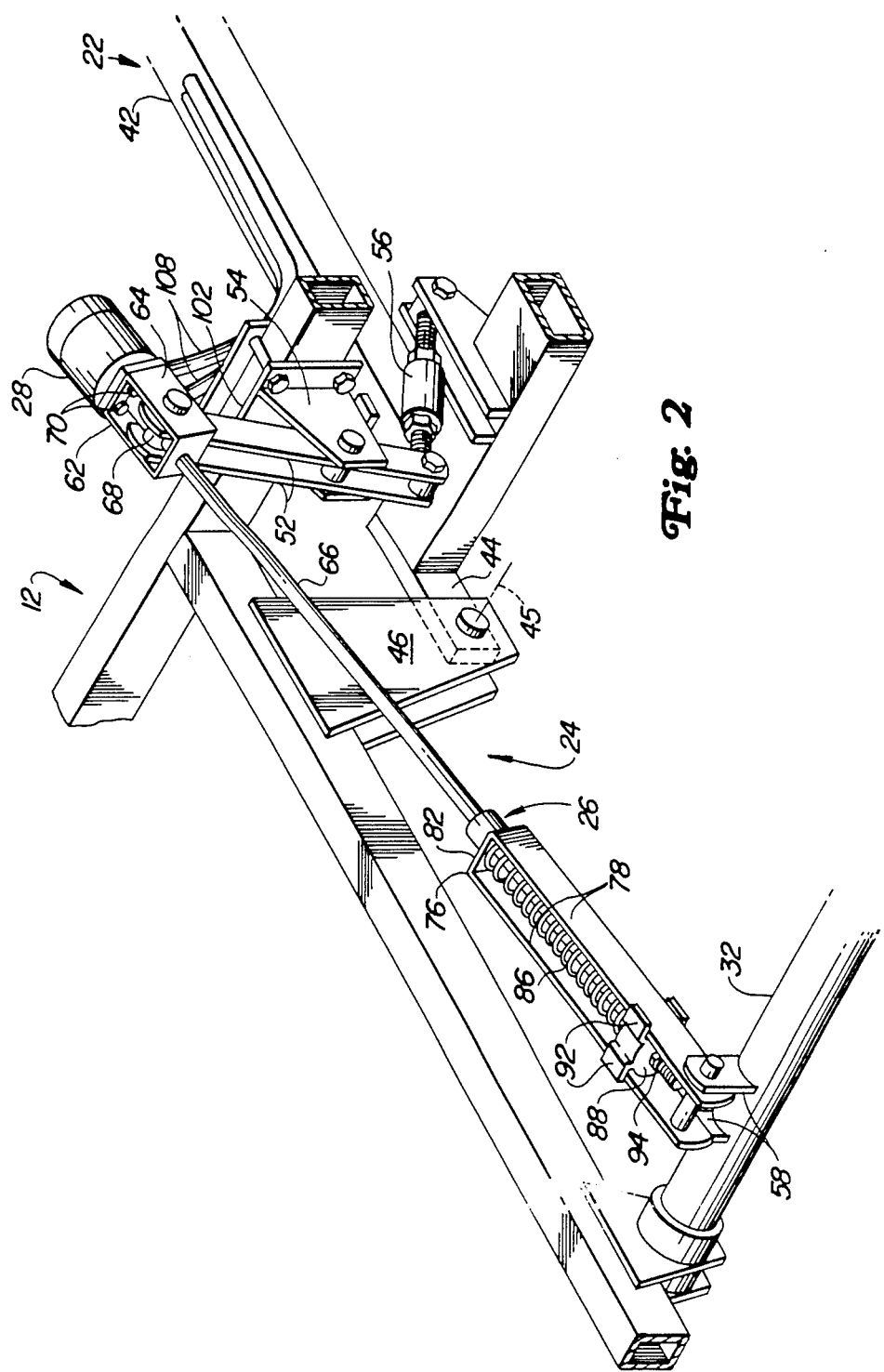
FIG. 2 is an enlarged side perspective view of the leveling structure.

As best seen in FIG. 2, the arm 52 includes a pair of spaced, parallel plates. An open boxlike bracket 62 includes fore-and-aft extending sidewalls 64 pivotally connected to the respective plates of the arm 52 such that the space between the plates at the upper end of the arm remains open. The rotary hydraulic motor 28 is connected to the front wall of the bracket 64, and a threaded rod 66 is operably connected to the motor 28 and extends through a trunnion 68 pivotally connected to the arm 52 and the bracket 62. The rod extends through and is also supported within an aperture in the front wall of the boxlike bracket 62. The motor includes a plurality of internally threaded apertures, and a like plurality of bolts 70 extend through bushings loosely contained in the front wall of the bracket 62 and are threaded into the apertures to permit the motor to "float" during operation to eliminate binding.

A yoke 76 includes rearwardly directed side legs 78 connected at their aft ends to the rockshaft bracket 58. Bight portion 82 (FIG. 2) of the yoke 76 includes a hole for receiving the threaded end of the rod 66. The rod 66 extends through the bight portion 82, and a helical compression spring 86 is received over the end of the rod projecting through the bight portion 82. A rear spring abutment member 88, positioned on the threaded end of the rod 66, compresses the spring 86 to bias the rod rearwardly through the bight portion. The member 88 is internally threaded to receive the threaded end of the rod 66. The abutment member 88 is slidably received between the side legs 78 of the yoke 76 and is held against rotation with respect to the side legs by tabs 92. A lock nut 94 is threaded onto the aft end of the threaded rods 66 to prevent rotation of the rod out from the internally threaded abutment member 88. A pre-load is provided in the compression spring 86 when the harrow is raised to its transport position so that it will hold the upright arm 52 rearwardly against a stop 102 supported by the bracket 54 when the disk harrow is in its transport position. The pre-load is relatively large to maintain a substantially rigid hitch-to-frame connection during transport. Also during transport the spring acts as a shock absorber to cushion dynamic loads imposed on the implement.

In the field-working position, the threaded rod 66 may be rotated by activating the hydraulic motor 28 from the cab of the towing vehicle. The hydraulic motor 28 is connected by a pair of hydraulic lines 108 to a conventional operator control located in the tractor cab. An orifice (not shown) is provided in the fluid circuit to limit the speed of rotation of the motor 28. If during operation the front gangs 14 appear to be operating too deeply relative to the rear gangs 16, the operator activates the hydraulic motor 28 to thread the rod 66 farther into the internally threaded abutment member 88 to thereby decrease the effective length of the link member 26. Decreasing the effective length compresses the spring 86 and rotates the upright arm 52 rearwardly to force the forward portion of the hitch beam 42 downwardly, raising the forward end of the frame 12 and transferring more force to the rear gangs 16. If the rear disk gangs 16 are too deep compared to the front gangs 14, the hydraulic motor is operated in the opposite direction to increase the effective length of the link member 26 which raises the forward end of the hitch beam 42 and the aft end of the frame 12 relative to the forward end of the frame to thereby increase the force on the front gangs 14. Leveling and force transfer adjustments can be made on the go without need for the operator to leave the tractor cab. Screw thread pitch is selected such that once the proper leveling adjustment is made, the rod 66 and abutment member 88 maintain the desired effective length of the link member 26 independently of the rotary hydraulic motor 28.

To aid the operator in viewing the rotation of the rod 66 from the tractor, a mark or a projecting member (not shown) may be provided on the rod.

Having described the preferred embodiment, it will be apparent that modifications can be made without departing from the scope of the invention as defined in the accompanying claims.

We claim:

1. In a towed tillage implement such as a disk harrow having forward and aft gangs of tillage tools supported on a frame, vertically adjustable ground wheel structure connected to the frame, a hitch pivotally connected to the frame and adapted for connection to a towing vehicle having a source of hydraulic fluid under pressure, leveling structure for adjusting the relative heights of the forward and aft gangs comprising:

link means connected between the hitch ad the ground wheel structure for pivoting the hitch to automatically maintain the frame in a level condition as the ground wheel structure is adjusted, said link means including an arm, means operably connecting the arm to the hitch, rotatable screw structure connected between the arm and the ground wheel structure and having an effective length which determines the relative heights of the gangs and which varies with rotation of the screw structure, and means for rotating the screw structure from the towing vehicle including a hydraulic motor connected to the screw structure and to the source of hydraulic fluid.

2. The invention as set forth in claim 1 wherein said screw structure includes means for maintaining a preselected effective length independently of the hydraulic motor.

3. The invention as set forth in claim 1 including a motor mounting bracket connected to the arm and supporting the hydraulic motor on the arm.

4. The invention as set forth in claim 3 wherein the arm includes a bifurcated end, the motor mounting bracket comprises sidewalls pivotally connected to the bifurcated end, and an end wall connecting the sidewalls, and means for supporting the motor on the end wall.

5. The invention as set forth in claim 4 wherein the screw structure includes a rod connected to the motor and extending between the sidewalls of the mounting bracket.

6. The invention as set forth in claim 5 wherein the mounting bracket further includes a rear wall thereby defining an open box structure, said box structure generally encompassing the end of the arm.

7. The invention as set forth in claim 5 including a trunnion pivotally connected between the bracket sidewalls and rotatably supporting one end of the rod.

8. The invention as set forth in claim 2 wherein the means for maintaining a preselected effective length comprises a threaded rod and a mating threaded member having a screw thread pitch preventing relative rotation of said rod and mating threaded member except upon rotation of the motor.

* * * * *